United States Patent Office 3,251,784
Patented May 17, 1966

3,251,784
PRODUCTION OF HIGH MOLECULAR WEIGHT OXIDE POLYMERS USING ORGANOMETALLIC CATALYST AND HALOGEN COCATALYST
Adolfas Damusis, Detroit, Mich., assignor to Wyandotte Chemicals Corporation, Wyandotte, Mich., a corporation of Michigan
No Drawing. Filed Oct. 18, 1962, Ser. No. 231,579
27 Claims. (Cl. 260—2)

The present invention relates to a process for the production of oxide polymers and is more particularly concerned with a process for the production of polymers of an epoxidized monoolefinic hydrocarbon, especially high molecular weight polymers of an alkylene oxide.

Polymers of epoxide compounds, e.g., polyalkylene oxides, are valuable polyethers. Such liquid polymers may be used as solvents, chemical intermediates, and plasticizers for resins. Such solid, high molecular weight polymers may be molded into useful articles or employed as film-forming ingredients in protective coating compositions. The polymers are also useful as lubricants, binders, vehicles and intermediates in the rubber, food, pharmaceutical, cosmetic, agricultural, textile, petroleum, and other industries. Many of the valuable properties of polyalkyleneoxides vary with molecular weight. Some properties, such as film forming, strength of film, and thickening ability improve as molecular weight increases. In contrast, short-chain polymers, i.e., those having a low molecular weight, do not form films or form only waxy or brittle films. Only long-chain polymers give strong, stretchable films and the toughness of such films increases with molecular weight. The ability of the polymers to thicken mixtures also increases with molecular weight. However, their solubility decreases with an increase in molecular weight. Other properties are most pronounced at certain optimum molecular weights. Control of molecular weight gives control over the various properties of the polymer.

It would be desirable to be able to obtain higher molecular weight polyoxides than obtained by prior art methods in order to improve those properties which continually improve with increased molecular weight, and to be able to control the molecular weight of polyoxides in order to prepare different grades of polymers having various properties and combinations of properties.

It is therefore an object of the present invention to provide an improved method for the production of polyoxides. Another object is to provide a process for the production of polyoxides having molecular weights of 100,000 to 2,000,000 and more. Yet another object is to provide an epoxide polymerization catalyst system which will require less strenuous reaction conditions. Still another object is to provide a method of controlling the molecular weight of the polyoxide polymer.

Additional objects will be apparent to one skilled in the art and still other objects will become apparent hereinafter.

The foregoing and additional objects are accomplished by the provision of the catalyst system of the present invention.

It is already known from U.S. Patent 2,870,100 that it is possible to obtain polymers having molecular weights above 20,000 by bringing an epoxide, such as an alkylene oxide, into contact with an organometallic catalyst under a variety of conditions. It has now been found that oxide polymers of substantially higher molecular weight, (e.g., 100,000 to 2,000,000 and more) may be obtained when a minute amount of halogen cocatalyst is employed together with certain organometallic catalysts, that such a catalyst system requires less strenuous reaction conditions, and that the amount of halogen cocatalyst employed provides a means of controlling the molecular weight of the resulting polymer.

According to the process of the present invention, an epoxidized monoolefinic hydrocarbon is polymerized in the presence of a catalyst selected from the group consisting of alkyl and aryl metal alcoholates, aryl metals, complexes formed from various organometallic compounds, and mixtures thereof, and a minute amount of halogen cocatalyst. All of these catalysts have a common property of being further activated by the halogen. Alkyl metals, while polymerization catalysts for epoxide compounds when employed by themselves, are not activated by the amounts of halogen used in the present invention and are therefore not included as catalysts utilizable according to the invention.

The catalysts may have any one of the following formulae, in which the symbols employed have the same values throughout.

(1) Compounds of the formula $$\underset{\underset{R'_x}{|}}{R-Me-OR}$$

wherein R is a hydrocarbon radical of 1 to 10 carbon atoms, R' is a member of the class consisting of alhoholate (OR) and hydrocarbon radicals containing 1 to 10 carbon atoms, Me is a metal selected from Groups II and III of the Mendeléeff Periodic Table, and x is the valency of the metal Me minus 2 and may be zero. These catalysts are prepared by known methods, and compounds of this formula are referred to as alkyl and aryl metal alcoholates.

This type of catalyst can be divided into two groups:

(A) Alkyl or aryl metal alcoholates $$\underset{\underset{R-Me-R_x}{|}}{OR}$$

(B) Alkyl or aryl metal dialcoholates $$\underset{\underset{R-Me-OR_x}{|}}{OR}$$

Such compounds may for example be produced according to the following reaction:

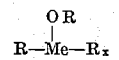

which involves oxidation of an aryl or alkyl metal, either prior to or in situ in the polymerization reaction mixture. (For this reaction see for example Sidgwick, "Chemical Elements and Their Compounds," Oxford at the Clarendon Press, 1950, vol. I, pp. 266-7.) The oxidation may for example be carried out at mol ratios varying from about 0.05 to 0.8 mol of oxygene per mol of organometallic compound. The preferred ratio is about 0.25 mol of oxygen per mol of alkyl or aryl metal.

(2) Various complexes which are also catalytically active are produced from alkyl or aryl metals, alkyl or aryl metal alcoholates, and metal alcoholates, in the foregoing oxidation process (1). A representative complex which may result from such reaction is:

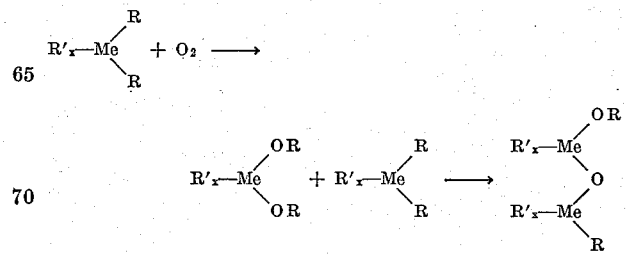

Other catalysts and complexes useful as catalysts may be prepared by reacting alkyl or aryl metals and metal alcoholates, according to the reaction:

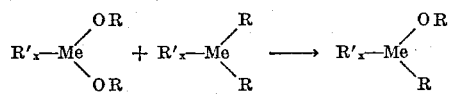

or the reaction

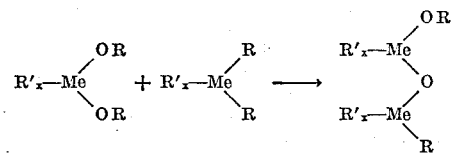

Still other complexes useful as catalysts are prepared according to the reaction:

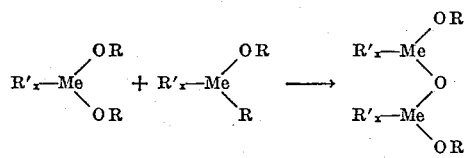

(3) Aryl metal compounds of the formula:

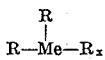

wherein at least one R is an aryl radical, are also useful as catalysts and are prepared by known methods.

The preparation of all of these catalysts may be carried out in the reaction vessel or they may be prepared separately and then introduced into the reaction vessel. Reactions to produce this type of compound are shown in Coates, "Organo-Metallic Compounds," John Wiley & Sons, Inc. (1956), at pp. 30 and 83.

The metal of the organometallic catalyst is selected from Group II or III metals, such as Be, Mg, Ca, Sr, Ba, Ra, Zn, Cd, Hg, Al, Ga, In, Tl, Sc, Y, La, and Ac. Groups II and III to which reference is made are of the Mendeléef Periodic Table. The preferred metals are zinc, aluminum, and magnesium. The hydrocarbon radicals (R) in all of the above formulae encompass aromatic and aliphatic, including cycloaliphatic, radicals, e.g., methyl, ethyl, propyl, isopropyl, isobutyl, butyl, tertiary butyl, allyl, phenyl, cresyl, xylyl, ethylphenyl, benzyl, cinnamyl, naphthyl, cyclopentyl, and the like, preference being given to straight or branched chain alkyl radicals. Examples of alcoholate (OR) radicals are methoxy, ethoxy, propoxy, octoxy, phenyloxy, naphthoxy, and the like. Suitable catalysts of the foregoing types are disclosed in Stewart U.S. Patent 2,870,100, Chiang U.S. Patent 3,014,014, and Bailey et al. U.S. Patent 3,029,216.

The halogen cocatalyst is selected from the group consisting of bromine, iodine, and chlorine, i.e., a halogen having an atomic weight from 35 to 128. In addition, the interhalogens may be used, e.g., BrCl, ClI, BrI, etc. Best results have been obtained using molecular iodine.

The value of the halogen cocatalyst in the process is in that it activates the organometallic catalyst and provides a method of controlling the molecular weight of the polymer. Although the present invention is not limited by theory, it is believed that the individual atoms of the halogen cocatalyst act as initiation centers for the polymerization mechanism. As a result, the molecular weight of the polymer generally varies inversely with the amount of cocatalyst, since the fewer centers of initiation the greater the number of molecules of monomer per molecule of polymer.

Polymerization is moreover often initiated by impurities in the alkylene oxide. However this initiation is random in nature, varying with the purity of the starting alkylene oxide. When the alkylene oxide is thoroughly purified, and a halogen cocatalyst is employed, the molecular weight of the product is readily controlled.

The catalyst system employed in the present invention (by which is meant the combination of both catalyst and cocatalyst) comprises about 0.05 to about 0.001 mol of organometallic catalyst and about 0.000002 to about 0.00025 mol of halogen cocatalyst per mol of epoxide monomer. A preferred range is from about 0.01 to about 0.005 mol of organometallic catalyst and from about 0.00001 to about 0.00005 mol of halogen cocatalyst per mole of epoxide.

Representative catalyst systems which have been found useful in the preparation of polyoxides, e.g., polyalkylene oxides, include butyl zinc butoxide and iodine, propyl zinc propoxide and iodine, diethyl zinc ethoxide and iodine, diphenyl zinc and iodine, butyl zinc butoxide and bromine, butyl zinc propoxide and bromine, diethyl aluminum ethoxide and iodine, and ethyl zinc butoxide and chlorine.

The process of the present invention is applicable to the polymerization of vicinal monoepoxy hydrocarbons, i.e., hydrocarbons containing an oxirane group, free from other than aromatic unsaturation. Although the process is especially suited to the production of high molecular weight polymers of alkylene oxides, particularly those of two to four carbon atoms, such as ethylene oxide, 1,2-propylene oxide, and isobutylene oxide, the process can also be used to obtain polymers of any other of the epoxide compounds such as 1,2-butylene oxide, 2,3-butylene oxide, 1,2-pentylene oxide, 2,3-hexylene oxide, 3,4-hexylene oxide, 3-ethyl-2,3-pentylene oxide, 1,2-decylene oxide, camphene oxide, styrene oxide, benzylethylene oxide, and similar compounds. The epoxide compounds polymerized by the process of the present invention include halohydrocarbon epoxy compounds, e.g., epichlorohydrin, epibromohydrin, and epiiodohydrin, and in speaking of monoepoxy hydrocarbons such compounds are included.

The process of the invention is conducted by bringing the epoxy compound into contact with the catalyst system. The polymerization may be carried out without a solvent although the best results are obtained by conducting the reaction in the presence of an inert solvent such as an aromatic hydrocarbon, e.g., benzene, toluene, xylene, naphthalene, Decalin, etc., an aliphatic hydrocarbon, e.g., n-hexane, n-heptane, n-octane, n-decane, n-dodecane, etc., or an alicyclic hydrocarbon, e.g., cyclohexane. The catalysts are usually handled in this type of solvent. Varying amounts of solvent may be used, from about 0 to 100 percent and more by weight of the epoxide treated.

The reaction is carried out either batchwise or in a continuous manner. The epoxide compound is added to the solvent containing the catalyst system or the reverse order of addition may be used. The reaction mixture is adjusted to the desired reaction conditions and ratios and allowed to react until a substantial amount of polymer has been obtained. The conditions under which the process of the present invention is carried out may be varied widely. The temperature may vary from about 0 or below to about 200° C. whereas the pressure may vary from about atmospheric (about 14.7 pounds per square inch) to about 300 pounds per square inch. The polymerization is usually performed under a nitrogen atmosphere to avoid excesive oxidation of the catalyst.

In batch polymerization the desired amounts of the epoxide, catalyst, cocatalyst, and solvent are usually brought together in a closed reaction vessel wherein the polymerization is caused to occur. Continuous polymerization is usually carried out in an autoclave by adding the epoxide compound to the solvent and catalyst system at a rate which will maintain the desired pressure and temperature. After the polymerization is complete, the polymer may be separated as by centrifugation or decantation, purified as by reprecipitation with acetone, and if desired treated with an antioxidant such as a polyalkylpolyphenol to prevent oxidation upon storage.

It is frequently desirable to provide the polymeric product of the present invention in a granular or powdery form for easier handling and rapid formation of solutions. This may be conveniently accomplished by polymerization in a blend of solvent and nonsolvent or by mixing the polymer with a blend of solvent and nonsolvent either prior to or after heating the blend to a temperature above the melting point of the polymer, preferably below about 65° C. Upon mixing or agitating the polymer with the blend at such a temperature, a partially compatible mixture is formed. This mixture is then mixed with a quantity of nonsolvent and allowed to cool with stirring. The polymer emerges from this mixture in the desired granular form.

Solvents which may be employed in this procedure are strong solvents such as acetonitrile, dimethyl Cellosolve (ethylene glycol dimethyl ether), ethylene diamine, trichloroethylene, methylene dichloride, ethylene dichloride, water, alcohol with water, and partial solvents (solvents in which the polymer may swell but not dissolve polyethylene oxide at room temperature but in which the polymer does dissolve it at elevated temperatures), for example, higher ketones, acetates, Cellosolves (2-ethoxyethanol and ethers thereof), dimethyl formamide, alcohols, aromatic hydrocarbons such as toluene, benzene, xylene, naphthalene, and saturated naphthalenes such as Decalin and Tetralin. Nonsolvents for the polymer which may be employed are, for example, anhydrous acetone, ethyl ether, diisopropyl ether, fluorocarbons, and liquid straight-chain or cyclic aliphatic hydrocarbons such as hexane, cyclohexane, octane, heptane, decane, dodecane, and the like.

A preferred aspect of the invention is to employ a blend of inert solvent, such as an aromatic hydrocarbon, e.g., benzene, toluene, xylene, naphthalene, or a hydrogenated naphthalene, such as Tetralin or Decalin, and an inert nonsolvent, such as ethyl ether, diisopropyl ether, or a liquid aliphatic hydrocarbon, as the solvent for the polymerization, and to carry out the granulation in situ in the reaction vessel by adding nonsolvent thereto. Such a granulation can be simply carried out by employing a blend of benzene and n-hexane, preferably about 60 to 70 parts by weight of benzene and 40 to 30 parts by weight of n-hexane, for the polymerization reaction, and adding more hexane upon completion. When operating with polyethylene oxide, the 60/40 by weight benzene to hexane ratio is somewhat critical, since a slight increase over this ratio usually breaks the solution. When operating with the polyalkylene oxides, the ratios will of course be somewhat different, it being understood however that the solvent mixture at this point in the procedure, i.e., during the polymerization, should be such as to maintain the polyalkylene oxide in solution. A surfactant, which does not contain reactive hydrogen, such as an alkyl aryl ether, may be employed to facilitate granulation. Normally, 0.1 to 5 percent of surfactant based on total amount of polymer is employed.

The polyoxide compounds produced by the process of the present invention are susceptible to deterioration by oxidation. To prevent this oxidation they are usually sprayed with antioxidants immediately after purification. Examples of antioxidants effective with polyoxide compounds are styrenated phenol, polyalkyl polyphenols, 2,2-methylene bis(4-methyl-6-tertiary-butylphenol) 2,2-thiobis(4-methyl-6-tertiary - butyl - phenol), hydroquinone monobenzyl ether, diphenylamine and acetone, and N-phenyl-N'-(p-toluene sulfonyl)-p-phenylene diamine.

The following examples are given by way of illustration only and are not to be construed as limiting. The ethylene oxide used in the examples except the first two was purified by distillation through columns filled with lithium hydride, Ascarite (sodium hydroxide-asbestos carbon dioxide absorbent) and calcium sulfate. Impurities in ethylene oxide in the first two samples are the cause of a too low molecular weight. When the purified ethylene oxide was used the role of halogen as a cocatalyst controlling the molecular weight was more apparent. All solvents used were purified by treatment with lithium hydride and redistillation. The dipropyl zinc and dibutyl zinc employed as catalysts were prepared by the Grignard reaction and redistilled. All of the polymerizations were carried out in a nitrogen atmosphere. Parts are by weight.

EXAMPLE 1

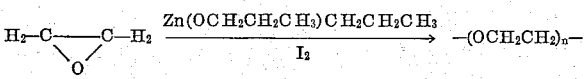

One mol (44.05 parts) of ethylene oxide is introduced into a reaction flask containing 21.6 parts of benzene, 32.4 parts of cyclohexane, 0.005 mol (0.76 part) of dipropyl zinc, 0.00001 mol (0.003 part) of iodine, and 0.00125 mol (0.04 part) of oxygen. The reaction flask is closed under a nitrogen atmosphere and placed in a water bath maintained at 60° C. for a period of 24 hours. The polymer is collected by decantation, purified by reprecipitation with acetone, and sprayed while wet with polyalkyl polyphenol in order to prevent oxidation. The polymer has a molecular weight of 348,390.

EXAMPLE 2

A polymerization is carried out according to Example 1 using 0.01 mol (1.51 parts) of dipropyl zinc, 0.000005 mol (0.0013 part) of iodine and 0.0025 mol (0.08 part) of oxygen. The resulting polymer has a molecular weight of 589,000 and an intrinsic viscosity of 4.057.

EXAMPLE 3

A polymerization is carried out according to Example 1 using 1 mol (44.05 parts) of purified ethylene oxide, 0.01 mol (1.51 parts) of dipropyl zinc, 0.00001 mol (0.003 part) of iodine and 0.0025 mol (0.08 part) of oxygen in a solution of 11.22 parts of cyclohexane over a period of 48 hours. The resulting polymer has a molecular weight of 1,038,750, an intrinsic viscosity of 6.05, a tensile strength of 1600 pounds per square inch and an elongation of 2200 percent.

Oxidation of dibutyl zinc

One mol of dibutyl zinc (179 parts) is dissolved in 1800 parts of n-hexane. Dry oxygen is bubbled through this solution until 0.25 mol is absorbed. The resulting product is referred to as 25% oxidized dibutyl zinc.

Oxidation of dipropyl zinc

One mol of dipropyl zinc (151 parts) is oxidized in the same manner employed for dibutyl zinc. The product is referred to as 25% oxidized dipropyl zinc.

The following Examples 4 through 6 illustrate the control of molecular weight afforded by the halogen cocatalyst.

EXAMPLE 4

Two mols (88.1 parts) of ethylene oxide are introduced continuously into an autoclave containing 120.8 parts of benzene, 97.2 parts of hexane, 0.015 mol (2.50 parts) of 25% oxidized dipropyl zinc, and 0.00002 mol (0.005 part) of iodine. The temperature within the autoclave is maintained at 110 to 135° C. and the pressure at 110 to 120 pounds per square inch. The low reaction pressure is maintained by coordination of the speed of polymerization and the continuous addition of ethylene oxide. The reaction is completed in a 2-hour period. The polymer is introduced into a nonsolvent (n-hexane) and granulated by heating the mixture above the polymer melting point and then cooling to substantially below the polymer melting point.

The resulting polymer has a molecular weight of 2,340,000.

EXAMPLE 5

A polymerization is carried out according to Example 4 using 0.01 mol (1.67 parts) of 25% oxidized dipropyl zinc and 0.00001 mol (0.003 part) of iodine. The temperature within the autoclave is adjusted to 110 to 135° C. and the pressure to 110 pounds per square inch.

The polymerization reaction is allowed to continue for a period of 2 hours and 30 minutes. The resulting polymer has a molecular weight of 3,064,800 and an intrinsic viscosity of 14.4.

EXAMPLE 6

A polymerization is carried out according to Example 4 using 0.01 mol (1.67 parts) of 25% oxidized dipropyl zinc and .0001 mol (0.03 part) of iodine. The temperature within the autoclave is adjusted to 110 to 135° C. and the pressure to 110 pounds per square inch.

The polymerization is carried out over a period of 2 hours and 30 minutes. The resulting polymer has a molecular weight of 1,907,000 and an intrinsic viscosity of 9.9.

Another series of examples (7 through 9) was conducted in order to demonstrate the reproducibility of the polymerization.

EXAMPLE 7

Four mols (176.2 parts) of ethylene oxide are introduced into an autoclave containing 216.04 parts of cyclohexane, 0.04 mol (6.70 parts) of 25% oxidized dipropyl zinc, and 0.00016 mol (0.044 part) of iodine. The temperature within the autoclave is adjusted to 135 to 151° C. and the pressure to 25 pounds per square inch. After a reaction period of 1 hour, the polymer is collected by decantation and treated as in Example 1. The resulting polymer has a molecular weight of 1,399,200, an intrinsic viscosity of 6, a tensile strength of 1543 pounds per square inch, and an elongation of 800 percent.

EXAMPLE 8

A polymerization is carried out according to Example 7 using 3 mols of ethylene oxide (132 parts), 0.00012 mol (0.033 part) of iodine, 135 to 150° C. and 280 pounds per square inch pressure. After a reaction period of 1 hour and 20 minutes, a polymer is obtained with a molecular weight of 1,255,200.

EXAMPLE 9

A polymerization is carried out according to Example 7 using 3 mols of ethylene oxide (132 parts), 216 parts of toluene, 0.00012 mol (0.033 part) of iodine, 135 to 150° C., and 235 pounds per square inch pressure. After a reaction period of 1 hour and 30 minutes, a polymer is obtained with a molecular weight of 1,245,800.

EXAMPLE 10

Four-hundredths mol (6.04 parts) of dipropyl zinc and 0.00016 mol (0.044 part) of iodine are introduced into an autoclave containing 216.04 parts of cyclohexane and 0.01 mol (0.32 part) of oxygen. The temperature within the autoclave is adjusted to 140 to 152° C. and the pressure to 190 pounds per square inch. Four mols (176.20 parts) of ethylene oxide are introduced into the autoclave over a period of 1 hour and 45 minutes, the rate of addition being used to control the temperature and pressure within the autoclave. The resulting polymer has a molecular weight of 2,182,800, an intrinsic viscosity of 11, a tensile strength of 1730 pounds per square inch, and an elongation of 2,200 percent. The polymer is collected and treated as in Example 1

EXAMPLES 11 to 14

These polymerizations are carried out according to Example 10 with the conditions and results noted in the following table:

| Example No. | Mols of Ethylene Oxide | Mols of Dipropyl Zinc 25% oxidized | Mols of Iodine | Temperature (degrees centigrade) | Pressure (pounds per square inch) | Time (hours) | Solvent | Molecular Weight |
|---|---|---|---|---|---|---|---|---|
| 11 | 6 | 0.04 | 24×10⁻⁵ | 140 to 150 | 215 | 1:20 | Cyclohexane | 1,200,600. |
| 12 | 6 | 0.04 | | 140 to 150 | 200 | 1:45 | do | Waxy (no cocatalyst.) |
| 13 | 4 | 0.04 | 8×10⁻⁵ | 135 to 155 | 180 | 1:45 | Toluene | 1,773,600. |
| 14 | 4 | 0.02 | 8×10⁻⁵ | 135 to 150 | 180 | 1:30 | do | 250,000 (very small amount of catalyst). |

EXAMPLE 15

A polymerization is carried out according to Example 10 using 1 mol (44 parts) of ethylene oxide, 0.01 mol (1.95 parts) of 25% oxidized dibutyl zinc, 0.000025 mol (0.0064 part) of iodine, 29 parts of benzene, and 9 parts of n-hexane. The temperature is 115 to 125° C. and the pressure 120 pounds per square inch. After the reaction has run for 2 hours, 50 parts of n-hexane are added and the reaction mixture is allowed to cool. The polymer is collected by decantation and sprayed with polyalkyl polyphenol antioxidant to prevent oxidation. The product precipitates as a granular polymer upon cooling of the reaction mixture, containing a few fluffy agglomerates of the polymer. Conversion: 88 percent. Molecular weight: 1,850,000.

EXAMPLE 16

One mol (44 parts) of ethylene oxide, 0.0075 mol (1.25 parts) of 25% oxidized dipropyl zinc, and 0.00005 mol (0.013 part) of iodine are introduced into a reaction flask containing 44 parts of n-hexane. The flask is placed is a water bath and maintained at 60° C. for a period of 48 hours. The resulting polymer is collected by decantation and treated as in Example 1. Conversion: 86 percent. Molecular weight: 1,220,000.

EXAMPLE 17

A polymerization is carried out according to Example 1 using one mol (44 parts) of ethylene oxide, 0.01 mol (1.67 parts) of 25% oxidized dipropyl zinc, 0.0001 mol (0.03 part) of iodine, 103 parts of benzene, no cyclohexane, and a period of 48 hours. Conversion: 92 percent. Molecular weight: 720,000.

EXAMPLE 18

A polymerization is carried out according to Example 15 using 1 mol (44 parts) of ethylene oxide, 0.008 mol (1.34 parts) of 25% oxidized dipropyl zinc, 66 parts of n-hexane, room temperature and 120 hours. Conversion: 100 percent. Molecular weight: 320,000.

EXAMPLE 19

One mol (44 parts) of ethylene oxide is introduced into a reaction flask containing 43 parts of benzene, 0.01 mol (2.19 parts) of diphenyl zinc and 0.00001 mol (0.003 part) of iodine. The reaction flask is closed under a nitrogen atmosphere and placed in a water bath maintained at 70° C. for a period of 48 hours. The conversion is 100 percent. The polymer has a molecular weight of 2,060,000.

EXAMPLE 20

A polymerization is carried out according to the process of Example 19 wherein the catalyst is formed from 0.005 mol (0.89 part) of dibutyl zinc and 0.005 mol (1.07 parts) of aluminum triisopropoxide, 0.00001 mol (0.003 part) of iodine, and 93.5 parts of benzene. The conversion is 100 percent. The polymer has a molecular weight of 2,200,600.

The following examples, especially 21 and 22, illustrate the value of the cocatalyst in activating the catalyst.

EXAMPLE 21

One mol (44 parts) of ethylene oxide is introduced into a reaction flask containing 90 parts of benzene, 0.005 mol (0.89 part) of dibutyl zinc and 0.005 mol (1.07 parts) of aluminum triisopropoxide. The flask is closed under a nitrogen atmosphere and placed in a water bath which is maintained at 20° C. for 24 hours. The resulting polymer has a molecular weight of 860,000.

EXAMPLE 22

A polymerization is carried out according to the process of Example 21, the reaction mixture also including 0.00002 mol (0.005 part) of iodine. The molecular weight of the resulting polymer is 1,670,000.

EXAMPLE 23

Ten mols (440 parts) of ethylene oxide are continuously introduced under a nitrogen atmosphere into an autoclave containing 604 parts of benzene, 486 parts of n-hexane, 0.025 mol (5 parts) of aluminum triisopropoxide and 0.025 mol (4.5 parts) of dibutyl zinc and .0001 mol (.03 part) of iodine. The temperature within the autoclave is maintained at 110 to 120° C. by coordination of the speed of polymerization and the continuous addition of ethylene oxide. The reaction is carried out over a 2-hour period. The conversion is 100 percent. The polymer has a molecular weight of 2,420,000.

EXAMPLE 24

Two hundred mols (8800 parts) of ethylene oxide are introduced continuously over a period of 1½ hours under a nitrogen atmosphere into an autoclave containing 22,400 parts of benzene, 8,500 parts of n-hexane, 2 mols (390 parts) of 25% oxidized dibutyl zinc, and 0.004 mol (1.02 parts) of iodine. The autoclave is adjusted to a temperature of 115 to 136° C. and a pressure of 106 pounds per square inch. The rate of addition of ethylene oxide is used to maintain these conditions. After the last monomer is added and the pressure has dropped to 60 pounds per square inch and the temperature to 70° C., 2,900 parts of n-hexane are added to the reaction mixture. The partially broken mixture is transferred to another vessel and stirred vigorously for a period of 2 hours. The granulated purified polymer is collectced by decantation, blended with styrenated phenol, an antioxidant, and dried by vacuumization. A 100 percent conversion to a polymer having a molecular weight of 1,200,000 is obtained.

EXAMPLE 25

A polymerization is carried out according to Example 24 using 250 mols (11,000 parts) of ethylene oxide, 2.5 mols (478.5 parts) of 25% oxidized dibutyl zinc, 16,683 parts of benzene, 4,764 parts of n-hexane in the first addition and 4,764 parts in the second addition, and 0.0025 mol (.63 part) of iodine. The temperature employed is 115 to 125° C. and the pressure 125 pounds per square inch. The polymer is treated with an antioxidant and is collected by decantation. The resulting polymer has a molecular weight of 1,540,000 and is obtained in a 97 percent conversion.

EXAMPLE 26

A polymerization is carried out according to Example 25 using 1.25 mols (239.3 parts) of dibutyl zinc and 0.82 mol (167.3 parts) of aluminum triisopropoxide and 0.0025 mol (.63 part) of iodine. The resulting polymer has a molecular weight of 1,760,000 and is obtained in a 100 percent conversion.

EXAMPLE 27

A polymerization is carried out according to Example 25 using .0025 mol (0.18 part) of chlorine instead of the iodine cocatalyst employed therein. The results are substantially the same as in Example 25.

EXAMPLE 28

A polymerization is carried out according to Example 26 using .0025 mol (0.40 part) of bromine instead of the iodine cocatalyst there employed. The results are substantially the same as in Example 25.

Various modifications and equivalents will be apparent to one skilled in the art and may be made in the method of the present invention without departing from the spirit or scope thereof, and it is to be understood that the invention is therefore to be limited only by the scope of the appended claims.

I claim:

1. A process for the production of a polymer of an epoxide compound comprising polymerizing by mixing and reacting a vicinal monoepoxy hydrocarbon monomer free from other than aromatic unsaturation in the presence of a catalytic an organometallic catalyst selected from the group consisting of alkyl and aryl metal alcoholates, aryl metals, complexes with each other of members of the group consisting of alkyl and aryl metals, alkyl metal alcoholates, aryl metal alcoholates, and metal alcoholates, and mixtures thereof, the alkyl, aryl, and alcoholate radicals containing from 1 to 10 carbon atoms, inclusive, the metal in each case being selected from Groups II and III of the Mendeléeff Periodic Table, and from about 0.000002 to about 0.00025 mol of a halogen cocatalyst having an atomic weight between 35 and 128 for each mol of starting expoxide compound.

2. The process of claim 1, wherein the halogen cocatalyst is iodine.

3. A process for the production of a polymer of an epoxide compound comprising polymerizing by mixing and reacting a vicinal monoepoxy hydrocarbon monomer free from other than aromatic unsaturation at a temperature of about 0 to about 200° C. and a pressure of about atmospheric to about 300 pounds per square inch in the presence of about 0.001 to 0.05 mol of an organometallic catalyst selected from the group consisting of alkyl and aryl metal alcoholates, aryl metals, complexes of members of the group consisting of alkyl metals, aryl metals, alkyl metal alcoholates, aryl metal alcoholates, and metal alcoholates with each other, and mixtures thereof, wherein the metals are selected from Groups II and III of the Mendeléeff Periodic Table, and wherein the alkyl, aryl, and alcoholate radicals contain from 1 to 10 carbon atoms, inclusive, and from about 0.000002 to about 0.00025 mol of a halogen cocatalyst having an atomic weight between 35 and 128 for each mol of starting epoxide compound.

4. The process of claim 3, wherein the halogen cocatalyst is iodine.

5. A process for the production of a polymer of an epoxide compound comprising polymerizing by mixing and reacting a vicinal monoepoxy hydrocarbon monomer free from other than aromatic unsaturation at a temperature of about 0 to 200° C. and a pressure of about atmospheric to about 300 pounds per square inch in the presence of about 0.001 to about 0.05 mol of a catalyst of the formula:

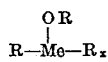

wherein each R is a hydrocarbon radical free of ethylenic and acetylenic unsaturation and of from 1 to ten carbon atoms, inclusive, Me is a metal selected from Groups II and III of the Mendeléeff Periodic Table, and $x$ is the valency of the metal Me minus 2, and about 0.000002 to about 0.00025 mol of iodine cocatalyst for every mol of epoxide compound.

6. The process according to claim 5, wherein the catalyst of the given formula is employed in a ratio of about 0.01 to about 0.005 mol for every mol of epoxide compound.

7. The process according to claim 6, wherein the iodine is employed in the ratio of about 0.00001 to about 0.00005 mol for every mol of epoxide compound.

8. The process according to claim 7, wherein the epoxide compound is an alkylene oxide having up to a maximum of 10 carbon atoms.

9. The process according to claim 8, wherein the alkylene oxide is propylene oxide.

10. The process according to claim 8, wherein the alkylene oxide is ethylene oxide.

11. The process according to claim 7, wherein the alkyl metal alcoholate is butyl zinc butoxide.

12. The process according to claim 7, wherein the alkyl metal alcoholate is propyl zinc propoxide.

13. A process for the production of a polymer of an epoxide compound comprising polymerizing by mixing and reacting avicinal monoepoxy hydrocarbon monomer free from other than aromatic unsaturation at a temperature of about 0 to about 200° C. and a pressure of about atmospheric to about 300 pounds per square inch in the presence of about 0.001 to about 0.05 mol of a catalyst of the formula:

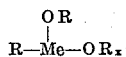

wherein each R is a hydrocarbon radical free of ethylenic and acetylenic unsaturation and of 1 to 10 carbon atoms, inclusive, Me is a metal selected from Groups II and III of the Mendeléeff Periodic Table, and $x$ is the valency of the metal Me minus 2, and about 0.000002 to about 0.00025 mol of iodine cocatalyst for every mol of epoxide compound.

14. The process according to claim 13, wherein the catalyst of the given formula is employed in a ratio of about 0.01 to about 0.005 mol for every mol of epoxide compound.

15. The process according to claim 14, wherein the iodine is employed in a ratio of about 0.00001 to about 0.00005 mol for every mol of epoxide compound.

16. The process according to claim 15, wherein the epoxide compound is an alkylene oxide having up to a maximum of 10 carbon atoms.

17. The process according to claim 16, wherein the alkylene oxide is ethylene oxide.

18. The process according to claim 16, wherein the alkylene oxide is propylene oxide.

19. A process for the production of a polymer of an epoxide compound comprising polymerizing by mixing and reacting a vicinal monoepoxy hydrocarbon monomer free from other than aromatic unsaturation at a temperature of about 0 to about 200° C. and a pressure of about atmospheric to about 300 pounds per square inch in the presence of about 0.005 to about 0.01 mol of a catalyst of the formula:

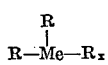

wherein each R is a hydrocarbon radical free of ethylenic and acetylenic unsaturation and of 1 to 10 carbon atoms, inclusive, at least one of which is an aryl radical, Me is a metal selected from Groups II and III of the Mendeléeff Periodic Table, and $x$ is the valency of the metal Me minus 2, and about 0.00001 to about 0.00005 mol of iodine cocatalyst for every mol of epoxide compound.

20. The process according to claim 19, wherein the epoxide compound is an alkylene oxide having up to a maximum of 10 carbon atoms.

21. The process according to claim 20, wherein the alkylene oxide is propylene oxide.

22. The process according to claim 20, wherein the alkylene oxide is ethylene oxide.

23. A process for the production of a polymer of an epoxide compound comprising polymerizing by mixing and reacting a vicinal monoepoxy hydrocarbon monomer free from other than aromatic unsaturation at a temperature of about 0 to about 200° C. and a pressure of about atmospheric to about 300 pounds per square inch in the presence of about 0.005 to about 0.01 mol of an organometallic complex formed by mixing and reacting with each other compounds selected from the group consisting of alkyl and aryl metals, alkyl and aryl metal alcoholates, and metal alcoholates, wherein the metals are selected from Groups II and III of the Mendeléeff Period Table, and wherein the alkyl, aryl and alcoholate radicals contain from 1 to 10 carbon atoms, and about 0.00001 to about 0.00005 mol of iodine cocatalyst for every mol of epoxide compound.

24. The process according to claim 23, wherein the epoxide compound is an alkylene oxide.

25. A process for the production of a solid granulated polyalkylene oxide polymer in accord with claim 1 comprising the further steps of (1) forming a partially compatible mixture by agitating a polyalkylene oxide polymer of a monomer having up to a maximum of 10 carbon atoms with a blend of solent and nonsolvent for the polymer at a temperature above the melting point of the polymer, the amount of solvent being sufficient to maintain the polymer in solution and the amount of nonsolvent being insufficient to break the solution, (2) admixing said partially compatible mixture with a further quantity of nonsolvent sufficient to break the solution upon cooling, and (3) cooling the mixture produced by step (2) to a temperature below the melting point of the polymer with agitation to cause precipitation of the polymer in granular form.

26. The process of claim 25, wherein the polymer is produced in a blend of solvent and nonsolvent and the granulation is carried out in situ in the polymerization vessel by adding the further quantity of nonsolvent thereto.

27. The process of claim 25, wherein the polyalkylene oxide is polyethylene oxide and wherein the blend of solvents is a blend of about 60 to 70 parts, by weight, of benzene and about 40 to 30 parts, by weight, of n-hexane.

References Cited by the Examiner

UNITED STATES PATENTS

| | | | |
|---|---|---|---|
| 2,870,100 | 1/1959 | Stewart et al. | 260—2 |
| 2,941,963 | 6/1960 | Bailey et al. | 260—2 |
| 3,014,014 | 12/1961 | Chiang | 260—91.1 |
| 3,024,219 | 3/1962 | France et al. | 260—47 |
| 3,029,216 | 4/1962 | Bailey et al. | 260—2 |
| 3,061,593 | 10/1962 | Taber | 260—78 |
| 3,132,112 | 5/1964 | Bartolomeo | 260—2 |

FOREIGN PATENTS

| | | |
|---|---|---|
| 875,558 | 8/1961 | Great Britain. |
| 876,648 | 9/1961 | Great Britain. |
| 878,033 | 9/1961 | Great Britain. |

(Other references on following page)

OTHER REFERENCES

Krause et al.: "Die Chemie der Metallorganischen Verbindungen," Edward Brothers, 1943, page 111 relied on (copy in Scientific Library, QD411 K7).

Hickinbottom: "Reactions of Organic Compounds," 2nd ed., Longmans, Greens, 1948, New York, pages 405 and 407 (Scientific Library Call No. QD251 H6, 1948).

American Chemical Society, "Metal-Organic Compounds," Washington, D.C., 1959, pp. 15 and 208 (Scientific Library Call No. QD411 A5).

Miller et al.: Article in the Journal of Polymer Science, vol. 34, pp. 161–163 (January 1959) (Scientific Library Call No. QD281 P6 J6).

Coates: "Organo-Metallic Compounds," 2nd ed., Wiley & Sons, 1960, New York, pages 70, 73, 101, and 146 (copy in Scientific Library, QD411 C6, 1960).

Fukui et al.: 688 (1962) March 29, 1962 (Japan), reported in Chemical Abstracts, vol. 58, page 11, 480B.

WILLIAM H. SHORT, *Primary Examiner.*